United States Patent
Zhou et al.

(10) Patent No.: US 11,836,912 B2
(45) Date of Patent: Dec. 5, 2023

(54) GRADING COSMETIC APPEARANCE OF A TEST OBJECT BASED ON MULTI-REGION DETERMINATION OF COSMETIC DEFECTS

(71) Applicant: Future Dial, Inc., Sunnyvale, CA (US)

(72) Inventors: Yan Zhou, Mountain View, CA (US); Jisheng Li, Los Altos, CA (US); George Huang, Los Altos Hills, CA (US); Chen Chen, San Ramon, CA (US)

(73) Assignee: Future Dial, Inc., Sunnyvale, CA (US)

( * ) Notice: Subject to any disclaimer, the term of this patent is extended or adjusted under 35 U.S.C. 154(b) by 0 days.

(21) Appl. No.: 17/028,239

(22) Filed: Sep. 22, 2020

(65) Prior Publication Data

US 2022/0092757 A1   Mar. 24, 2022

(51) Int. Cl.
*G06T 7/00* (2017.01)
*G06T 7/30* (2017.01)
(Continued)

(52) U.S. Cl.
CPC ......... *G06T 7/001* (2013.01); *G01N 21/8851* (2013.01); *G06T 7/194* (2017.01);
(Continued)

(58) Field of Classification Search
CPC ... G06T 7/001; G06T 7/30; G01N 2021/8854; G01N 2021/8874; G06K 9/78; G06V 10/10; G03B 15/06; F21V 3/0615
See application file for complete search history.

(56) References Cited

U.S. PATENT DOCUMENTS

| 4,677,473 A * | 6/1987 | Okamoto | G01N 21/8806 |
| | | | 356/613 |
| 4,847,663 A * | 7/1989 | Query | G03B 27/323 |
| | | | 355/70 |

(Continued)

FOREIGN PATENT DOCUMENTS

| CA | 2861423 A1 * | 8/2013 | G06K 9/2027 |
| CN | 110290257 A * | 9/2019 | |

(Continued)

OTHER PUBLICATIONS

Z. Wang, J. Tang, C. Cui, W. Li, Z. Xu and H. Han, "Review of Used Mobile Phone Recognition Method for Recycling Equipment," 2020 39th Chinese Control Conference (CCC), 2020, pp. 1105-1110, doi: 10.23919/CCC50068.2020.9189577. (Year: 2020).*

(Continued)

*Primary Examiner* — Michael Robert Cammarata
(74) *Attorney, Agent, or Firm* — Greenberg Traurig

(57) ABSTRACT

A system and method for grading the cosmetic appearance of a test object based on multi-region determination of cosmetic defects are disclosed. The method may include grading a test object, such as, but not limited to, a computing device, for refurbishing and selling refurbished devices. In at least one embodiment, the method may include receiving, by a processing device, a plurality of images of surfaces of a test object. A region of interest in each of the plurality of images is identified and defects are identified. The cosmetic appearance of each region of interest is graded based on the identified defects and are stored. The system may include a housing with a translucent dome and a movable platform for receiving and positioning a computing device. The system may include a plurality of cameras and lights arranged to capture different views of the computing device.

17 Claims, 10 Drawing Sheets

(51) Int. Cl.
  *G06V 10/10* (2022.01)
  *G01N 21/88* (2006.01)
  *G06T 7/194* (2017.01)
  *H04N 23/90* (2023.01)
(52) U.S. Cl.
  CPC ............... *G06T 7/30* (2017.01); *G06V 10/10* (2022.01); *H04N 23/90* (2023.01); *G01N 2021/8874* (2013.01); *G01N 2021/8887* (2013.01)

(56) References Cited

U.S. PATENT DOCUMENTS

| | | | | |
|---|---|---|---|---|
| 5,051,872 A * | 9/1991 | Anderson | ............... | F21S 8/00 362/558 |
| 5,619,429 A * | 4/1997 | Aloni | ............... | G01N 21/95607 382/141 |
| 5,845,002 A * | 12/1998 | Heck | ............... | B07C 5/3416 382/110 |
| 6,788,886 B2 | 9/2004 | Saigo | ............... | G03B 15/06 396/4 |
| 7,386,227 B1 * | 6/2008 | Henderson | ............. | G03B 15/03 396/164 |
| 7,826,675 B2 * | 11/2010 | Kisilev | ............... | G06T 5/30 382/257 |
| 7,881,965 B2 * | 2/2011 | Bowles | ............... | G06Q 10/30 705/14.37 |
| 8,358,813 B2 * | 1/2013 | Free | ............... | G06V 40/162 382/172 |
| 9,117,137 B2 * | 8/2015 | Uchiyama | ............. | G06T 7/0004 |
| 10,419,054 B1 | 9/2019 | Vantassell et al. | | |
| 10,713,775 B2 * | 7/2020 | Bae | ............... | G01B 11/24 |
| 10,753,882 B1 * | 8/2020 | Mahajan | ............... | H04N 7/18 |
| 10,921,685 B2 * | 2/2021 | Espinosa | ............... | G03B 15/06 |
| 11,481,568 B1 * | 10/2022 | Lozano | ............... | H04N 5/2252 |
| 2002/0128790 A1 | 9/2002 | Woodmansee | ........... | B23P 6/002 702/81 |
| 2003/0184740 A1* | 10/2003 | Paradis | ............... | G01N 21/9036 356/237.1 |
| 2006/0018530 A1* | 1/2006 | Oaki | ............... | G06T 7/001 382/144 |
| 2007/0223231 A1* | 9/2007 | Maes | ............... | G03B 15/06 362/311.06 |
| 2009/0213601 A1* | 8/2009 | Clugston, Jr. | ............... | G01J 1/42 362/464 |
| 2012/0327207 A1* | 12/2012 | Oe | ............... | A61B 5/0064 348/E5.09 |
| 2013/0046699 A1* | 2/2013 | Bowles | ............... | G06Q 30/00 705/306 |
| 2014/0267691 A1* | 9/2014 | Humphrey | ............... | G06T 7/0008 348/125 |
| 2016/0210734 A1 | 7/2016 | Kass | ............... | G06F 16/24578 |
| 2017/0256051 A1* | 9/2017 | Dwivedi | ............... | G06T 7/13 |
| 2017/0330158 A1* | 11/2017 | Librizzi | ............... | G06Q 30/0237 |
| 2018/0130197 A1* | 5/2018 | Weiss | ............... | G01B 11/022 |
| 2018/0232875 A1* | 8/2018 | Kanodia | ............... | G06T 5/50 |
| 2018/0246895 A1* | 8/2018 | Kass | ............... | G06T 7/001 |
| 2019/0035066 A1* | 1/2019 | Bae | ............... | G06T 7/001 |
| 2019/0096057 A1* | 3/2019 | Allen | ............... | G06T 7/0008 |
| 2019/0281781 A1* | 9/2019 | Borrowman | ............... | A01C 1/025 |
| 2019/0303717 A1* | 10/2019 | Bhaskar | ............... | G06K 9/6262 |
| 2020/0005070 A1* | 1/2020 | Ambikapathi | ... | G01N 21/95607 |
| 2020/0074615 A1* | 3/2020 | Nabavi | ............... | G06V 10/44 |
| 2020/0175352 A1* | 6/2020 | Cha | ............... | G06N 3/08 |
| 2020/0265487 A1* | 8/2020 | Silva | ............... | G06K 9/2027 |
| 2020/0313612 A1* | 10/2020 | He | ............... | H02S 50/15 |
| 2021/0110440 A1* | 4/2021 | Dion | ............... | G06K 9/00671 |
| 2021/0116392 A1* | 4/2021 | Fitzgerald | ............... | G01N 21/956 |
| 2021/0192484 A1* | 6/2021 | Forutanpour | ............... | G07F 7/06 |
| 2021/0192695 A1* | 6/2021 | Kosaka | ............... | G06T 7/70 |
| 2021/0279858 A1* | 9/2021 | Stoppe | ............... | G06T 7/0004 |
| 2021/0299879 A1* | 9/2021 | Pinter | ............... | B25J 9/1697 |
| 2021/0304393 A1* | 9/2021 | Ota | ............... | G06T 11/001 |
| 2021/0312702 A1* | 10/2021 | Holzer | ............... | H04N 13/282 |
| 2021/0317712 A1* | 10/2021 | Zhao | ............... | E21B 47/06 |
| 2022/0092763 A1 | 3/2022 | Zhou et al. | | |
| 2022/0172346 A1* | 6/2022 | Chen | ............... | G06V 10/82 |

FOREIGN PATENT DOCUMENTS

| | | | | |
|---|---|---|---|---|
| CN | 110646432 A | * | 1/2020 | |
| CN | 111157532 A | * | 5/2020 | |
| CN | 111257329 A | * | 6/2020 | |
| EP | 3418725 A1 | * | 12/2018 | ......... G01N 21/8806 |
| JP | 2004301776 A | * | 10/2004 | |
| JP | 2015076504 A | * | 4/2015 | |
| JP | 2017040510 A | * | 2/2017 | .......... G06T 7/0004 |
| KR | 101907349 B1 | * | 10/2018 | |
| KR | 20210025482 A | * | 3/2021 | |
| WO | WO-0169214 A1 | * | 9/2001 | ......... G01N 21/8806 |
| WO | WO-2020257811 A1 | * | 12/2020 | .......... G06T 7/0002 |
| WO | WO-2021082918 A1 | * | 5/2021 | |
| WO | WO-2021156756 A1 | * | 8/2021 | ............. G01N 21/89 |

OTHER PUBLICATIONS

M. Stutz, V. M. Thomas and S. Saar, "Linking bar codes to recycling information for mobile phones," IEEE International Symposium on Electronics and the Environment, 2004. Conference Record. 2004, 2004, pp. 313-316, doi: 10.1109/ISEE.2004.1299736. (Year: 2004).*
X. Liu and Y. Hu, "Inspection of IC wafer Defects Based on Image Registration," 2018 IEEE 3rd Advanced Information Technology, Electronic and Automation Control Conference (IAEAC), 2018, pp. 868-872, doi: 10.1109/IAEAC.2018.8577710. (Year: 2018).*
Czimmermann T, Ciuti G, Milazzo M, et al. Visual-Based Defect Detection and Classification Approaches for Industrial Applications—A Survey. Sensors (Basel). 2020;20(5):1459. Published Mar. 6, 2020. doi:10.3390/s20051459 (Year: 2020).*
F. Han, F. Xie, B. Zhang and J. Zhu, "Study of Defect Segmentation from a Mode Background Image," 2019 IEEE International Conference on Mechatronics and Automation (ICMA), 2019, pp. 1626-1631, doi: 10.1109/ICMA.2019.8816443. (Year: 2019).*
Oge Marques, "Image Segmentation," in Practical Image and Video Processing Using MATLAB, IEEE, 2011, pp. 365-386, doi: 10.1002/9781118093467.ch15. (Year: 2011).*
CTIATM Wireless Device Grading Scales Criteria and Definitions, Version 1, Dec. 2018, retrieved from https://api.ctia.org/wp-content/uploads/2018/12/CTIA-Wireless-Device-Grading-Scales-Criteria-and-Definitions-Version-1.0.pdf (Year: 2018).*
Marr D. and Hildreth E., 1980, Theory of edge detection, Proc. R. Soc. Lond. B.207187-217 http://doi.org/10.1098/rspb.1980.0020 (Year: 1980).*
W. Sun, S. You, J. Walker, K. Li and N. Barnes, "Structural Edge Detection: A Dataset and Benchmark," 2018 Digital Image Computing: Techniques and Applications (DICTA), 2018, pp. 1-8, doi: 10.1109/DICTA.2018.8615801. (Year: 2018).*
Kong (H. Kong, J. Yang and Z. Chen, "Accurate and Efficient Inspection of Speckle and Scratch Defects on Surfaces of Planar Products," in IEEE Transactions on Industrial Informatics, vol. 13, No. 4, pp. 1855-1865, Aug. 2017, doi: 10.1109/TII.2017.2668438) (Year: 2017).*
Voishvillo, N. A., and É. I. Khapugina. "Transmission of milk glass under diffuse and directional illumination." Measurement Techniques 27.3 (1984): 214-216. (Year: 1984).*

* cited by examiner

GRADING COSMETIC APPEARANCE OF A TEST OBJECT BASED ON MULTI-REGION DETERMINATION OF COSMETIC DEFECTS

FIELD OF THE TECHNOLOGY

At least some embodiments disclosed herein relate generally to cosmetic evaluation of an electronic device. More particularly, the embodiments relate to systems, devices, and methods for computer-aided cosmetic evaluation and categorization of a device such as a computing device.

BACKGROUND

Large volumes of computing devices (e.g., mobile devices, such as cellular telephones, tablets, etc.) are recycled and often refurbished. There are numerous aspects to the refurbishing process. One aspect includes inspecting the visual characteristics of the computing device to grade its visual appearance. Some of these devices are then refurbished and can be resold to new users.

The refurbishing process requires multiple steps on different, specialized workstations, and such a multi-step process requires lots of manual interaction, which is both error-prone and expensive.

BRIEF DESCRIPTION OF THE DRAWINGS

References are made to the accompanying drawings that form a part of this disclosure and illustrate embodiments in which the systems and methods described in this Specification can be practiced.

Like reference numbers represent like parts throughout.

DETAILED DESCRIPTION

Figure 1:
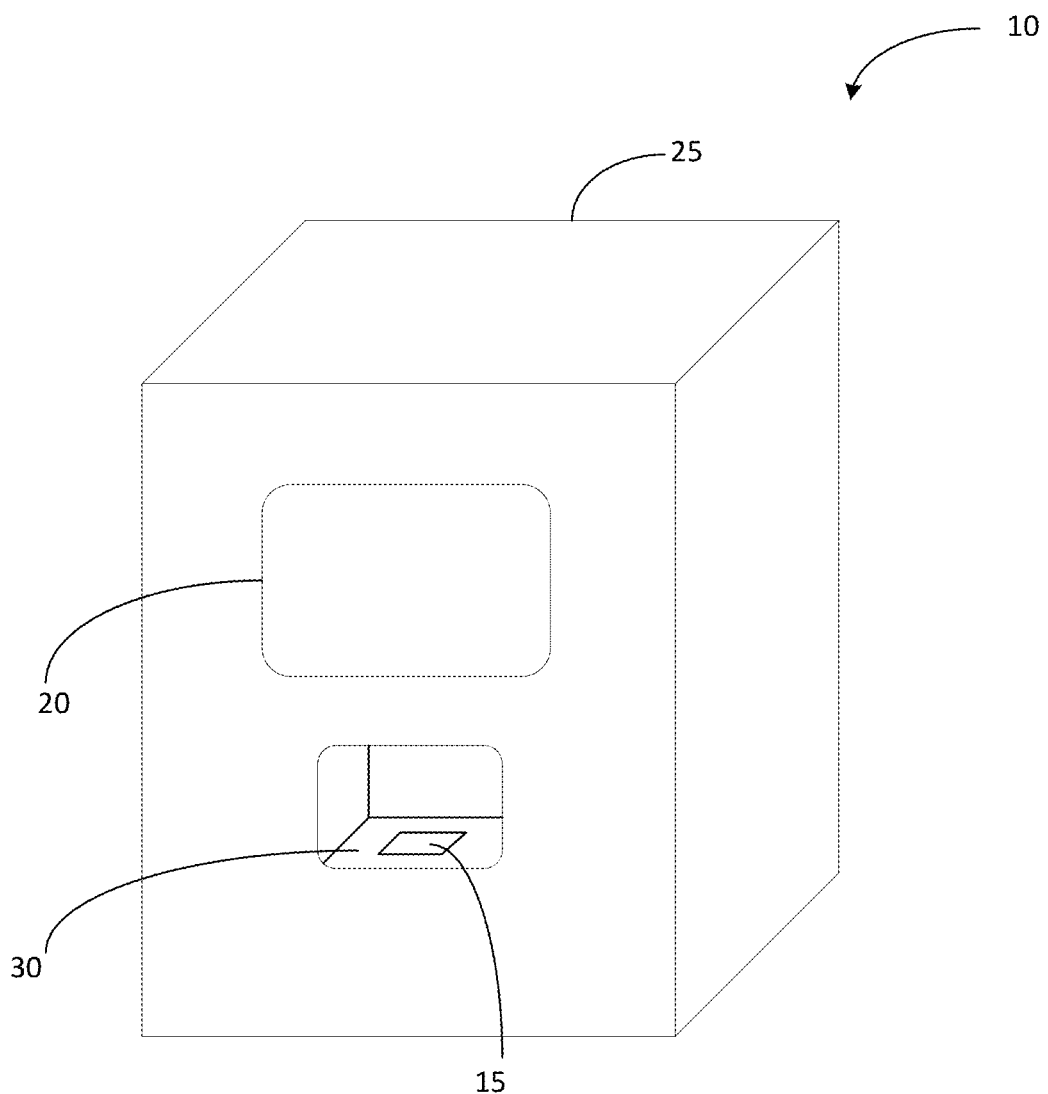
FIG. 1 shows a cosmetic inspection system, according to an embodiment.

Computing devices such as, but not limited to, smartphones, tablets, laptops, smartwatches, and the like, can be refurbished and resold as refurbished devices. The refurbishing process can include a cosmetic inspection to ensure that the secondhand computing device is a good candidate for refurbishment (e.g., in good condition such as free from scratches, dents, cracks, and the like).

The embodiments disclosed herein are directed to a system and method for inspecting computing devices (e.g., secondhand computing devices) and grading their cosmetic appearance.

Various examples are described herein which are directed to cosmetic inspection of a secondhand computing device. It is to be appreciated that the systems and methods can be applied to a computing device during the manufacturing process in accordance with the disclosure herein. In an embodiment, applying the cosmetic inspection during the manufacturing process could be leveraged to, for example, verify quality of the manufactured product.

A system for inspecting objects (e.g., computing devices such as smartphones, tablets, etc.) and grading the cosmetic appearance of the objects. The system includes a movable platform for receiving an object to be inspected ("test object"). The movable platform is capable of positioning the test object within a semi-transparent dome. The semi-transparent dome is white in color, has a light transmission rate from at or about 0.6% to at or about 1.6%, and is shaped to match a curvature of the test objects. The dome can be made of plastics such as polyvinylchloride (PVC). Sides of the dome may have an approximately half-cylindrical geometry. The dome has two open sides (one for entry of the test device and the other to provide a field of view for a camera). There are additional openings on two sides to provide a field of view for two additional cameras. When the images are to be captured, the test object is located in a center of the dome (with respect to horizontal dimensions of the dome) to provide optimal lighting conditions. Light transmission through the dome is such that glares/reflections from the lighting on the test object are reduced, enabling high quality images to be captured. The movable platform is capable of rotating the test object about a plurality of axes of rotation to capture images of all surfaces of the test object.

In an embodiment, a cosmetic inspection process can last less than at or about 20 seconds from the time of initiation to the time the computing device being inspected can be withdrawn from the cosmetic inspection system. In an embodiment, the cosmetic inspection process can last at or about 16 seconds. In an embodiment, a cosmetic grade can be generated by the system in less than at or about 30 seconds. In an embodiment, the cosmetic grade can be generated from at or about 25 seconds to at or about 30 seconds.

The usage of cameras in the cosmetic inspection system described herein can provide a faster output compared to prior devices which generally rely upon scanners instead of cameras.

In an embodiment, the cosmetic inspection system can include pneumatically controlled lift and rotation systems to move the computing device to an appropriate location for capturing the images via the camera system.

Captured images of the secondhand device can be compared against profile images corresponding to a similar device, the profile images being captured as images of a model assembly (e.g., good cosmetic condition). Based on the comparison, an appearance score can be generated and output to a display of the cosmetic inspection system for display to a user. The appearance score can be a combination of each captured view of the computing device such that the score is impacted if any of the surfaces (sides, front, back) include cosmetic defects such as scratches, cracks, dents, or the like.

A system for cosmetic inspection of a test object is disclosed that includes a movable platform for receiving a test object. The movable platform is capable of positioning the test object within a dome. A plurality of cameras arranged oriented to capture different views of a plurality of surfaces of the test object. A plurality lights arranged are outside the dome, the plurality of lights selectively enabled or disabled according to which of the plurality of surfaces of the test object is to be captured.

A system includes a housing, including a translucent dome and a movable platform for receiving a computing device, wherein the movable platform is capable of positioning the computing device within the dome. A plurality of cameras are arranged oriented to capture different views of a plurality of surfaces of the computing device when the computing device is disposed within the dome. A plurality lights are arranged outside the dome, the plurality of lights selectively enabled or disabled according to which of the plurality of surfaces of the computing device is to be captured.

A method includes receiving, by a processing device, a plurality of images of a test object, the plurality of images including a plurality of surfaces of the test object. The processing device selects a region of interest in each of the plurality of images, the region of interest comprising the test object having a background removed. For the plurality of regions of interest as selected, the method includes comparing, by the processing device, each region of interest with a corresponding profile image and identifying defects in each region of interest. The method includes grading, by the processing device, a cosmetic appearance of each region of interest based on the identified defects. The grades of the cosmetic appearance for each region of interest are stored.

A method includes capturing an image of a first surface of a computing device with a first camera. The method further includes determining, by a processing device, a model and manufacturer of the computing device based on the image of the first surface of the computing device. The method further includes rotating the computing device to capture a second surface of the computing device that is opposite the first surface. The method includes capturing an image of the second surface of the computing device with the first camera. The method includes moving the computing device to a second location and capturing an image of a third surface using a second camera and capturing an image of a fourth surface using a third camera. The method further includes rotating the computing device to capture fifth and sixth surfaces that are opposite the third and fourth surfaces and capturing an image of the fifth surface using the second camera and capturing an image of the sixth surface using the third camera. The method further includes selecting, by the processing device, a region of interest in each of the images, the region of interest comprising the computing device having a background removed. For the plurality of regions of interest as selected, comparing, by the processing device, each region of interest with a corresponding profile image and identifying defects in each region of interest. The method further includes grading, by the processing device, a cosmetic appearance of each region of interest based on the identified defects; and storing the grades of the cosmetic appearance for each region of interest.

A method for inspecting surfaces of an object ("test object") and grading the quality of the cosmetic appearance of the object is disclosed. The method includes locating an object to be inspected ("test object") at a specific location. A plurality of images of the test object are compared with images of a model object. The comparison includes a structure-edge detection algorithm to detect scratches and cracks on the surfaces of the test object. The structure-edge detection algorithm can be performed utilizing an artificial neural network. Because the lighting is controlled effectively through the dome structure of the system, the structure edge algorithm is more accurate in identifying the defects in the test object rather than reflections on the surface of the test object. For each image of the test object (corresponding to a surface of the test object), a score is provided based on how closely the test images match the model images. In the comparison, the cosmetic grading can analyze discoloration, use optical character recognition (OCR) to determine whether a mobile device is refurbished (and if so, by whom), handle stickers (removing or reading a sticker, etc.), and determine if there are any differences between two mobile devices of the same model (e.g. logo, sensor size, camera, etc.). The score for each surface is then utilized to form a cosmetic grade for the test object. The cosmetic grade is output as an indicator of the cosmetic quality of the test object.

FIG. 1 shows a cosmetic inspection system 10 for cosmetic analysis of a computing device 15, according to an embodiment. In an embodiment, the computing device 15 is a secondhand device that is being considered for refurbishment. In an embodiment, the computing device 15 can be a newly manufactured device that has yet to be sold.

The system 10 can generally be used to, for example, validate whether the computing device 15 is aesthetically acceptable as a candidate for refurbishment. In an embodiment, a computing device that is aesthetically acceptable may be generally free from cosmetic defects such as scratches, dents or chips, cracks, or the like. In an embodiment, the analysis can be part of a refurbishment process.

A computing device 15 tested by the system 10 can include, for example, a smartphone, a tablet, or the like. It is to be appreciated that these are examples of the computing device and that the computing device can vary beyond the stated list. Examples of other computing devices include, but are not limited to, a smartwatch, a mobile phone other than a smartphone, a personal digital assistant (PDA), a laptop computing device, or the like. Furthermore, the maker or manufacturer of the computing device 15 is not limited. That is, the system 10 can be used for cosmetic analysis of computing devices from different manufacturers so long as a calibration procedure is performed to create a profile image for the corresponding computing device.

The system 10 includes a display 20 for displaying results of the cosmetic inspection to the user. In an embodiment, the display 20 can be a combined display and input (e.g., a touchscreen). In an embodiment, the display 20 can be a display of a tablet or the like. In such an embodiment, a memory of the tablet can store one or more programs to be executed by a processing device of the tablet for inspecting the cosmetic appearance of the assembly computing device 15.

In the illustrated embodiment, the display 20 is secured to housing 25 of the system 10. In an embodiment, the display 20 can be separate from the housing 25 (i.e., not secured to the housing 25, but positioned near the system 10 and electronically connected to the system 10). However, it may be beneficial to secure the display 20 to the housing 25 to reduce a footprint of the system 10.

A platform 30 is utilized to position the computing device 15 within the system 10 for validation. The platform 30 enables each computing device 15 placed into the system 10 for validation to be placed in substantially the same location. The platform 30 also moves the computing device 15 to different locations to capture images of the computing device 15.

Figure 2:
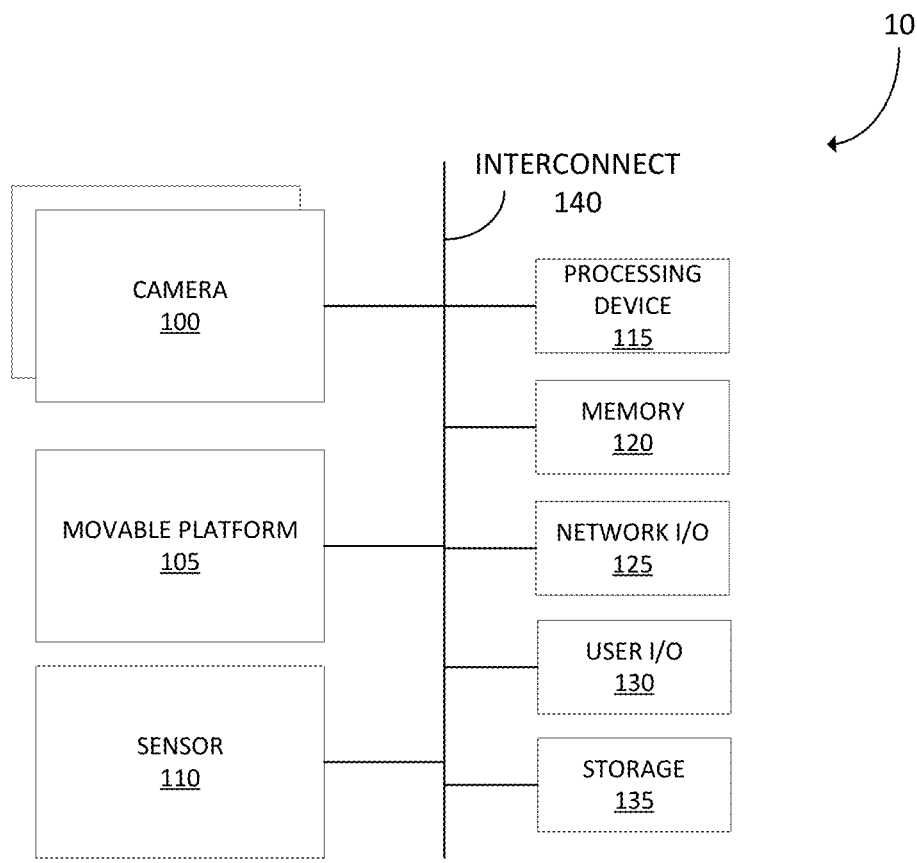
FIG. 2 shows a schematic architecture for the cosmetic inspection system of FIG. 1, according to an embodiment.

FIG. 2 shows a schematic architecture for the system 10 of FIG. 1, according to an embodiment.

The system 10 generally includes a plurality of cameras 100; a movable platform 105; one or more sensors 110; a processing device 115, memory 120, a network input/output (I/O) 125, user I/O 130, storage 135, and an interconnect 140. The processing device 115, memory 120, network input/output (I/O) 125, user I/O 130, storage 135, and interconnect 140 can be within the housing 25 in an embodiment. In an embodiment, the processing device 115, memory 120, network input/output (I/O) 125, user I/O 130, storage 135, and interconnect 140 can be external from the housing 25.

The plurality of cameras 100 are arranged in the system 10 to capture different views of the computing device 15. In an embodiment, the cameras 100 are digital cameras. For example, in an embodiment the system 10 includes three cameras 100 arranged to capture a top view, and two side views (as well as a bottom view and two additional side views after the computing device is rotated by the system 10).

The movable platform 105 can be, for example, configured to pneumatically move the computing device 15 in a vertical direction and horizontal directions. The movable platform 105 also includes ability to rotate about a vertical axis and about a horizontal axis to place the computing device 15 in different orientations respective of the cameras 100. This enables all six surfaces of the computing device 15 to be captured by the cameras 100.

The one or more sensors 110 can be used to determine when an object is placed on the movable platform as well as where the movable platform is disposed relative to the cameras 100 so that the computing device 15 is oriented and located in known locations to provide suitable lighting to capture high quality images.

The processing device 115 can retrieve and execute programming instructions stored in the memory 120, the storage 135, or combinations thereof. The processing device 115 can also store and retrieve application data residing in the memory 120. The programming instructions can perform the method described in accordance with FIGS. 8 and 9 below to inspect the cosmetic appearance of the computing device 15, and additionally, cause display of one or more graphical user interfaces (GUIs) on the display 20 showing an outcome of the inspection.

The interconnect 140 is used to transmit programming instructions and/or application data between the processing device 115, the user I/O 130, the memory 120, the storage 135, and the network I/O 125. The interconnect 140 can, for example, be one or more busses or the like. The processing device 115 can be a single processing device, multiple processing devices, or a single processing device having multiple processing cores. In an embodiment, the processing device 115 can be a single-threaded processing device. In an embodiment, the processing device 115 can be a multi-threaded processing device.

The memory 120 is generally included to be representative of a random-access memory such as, but not limited to, Static Random-Access Memory (SRAM), Dynamic Random-Access Memory (DRAM), or Flash. In an embodiment, the memory 120 can be a volatile memory. In an embodiment, the memory 120 can be a non-volatile memory. In an embodiment, at least a portion of the memory 120 can be virtual memory.

The storage 135 is generally included to be representative of a non-volatile memory such as, but not limited to, a hard disk drive, a solid-state device, removable memory cards, optical storage, flash memory devices, network attached storage (NAS), or connections to storage area network (SAN) devices, or other similar devices that may store non-volatile data. In an embodiment, the storage 135 is a computer readable medium. In an embodiment, the storage 135 can include storage that is external to the user device, such as in a cloud.

Figure 3:
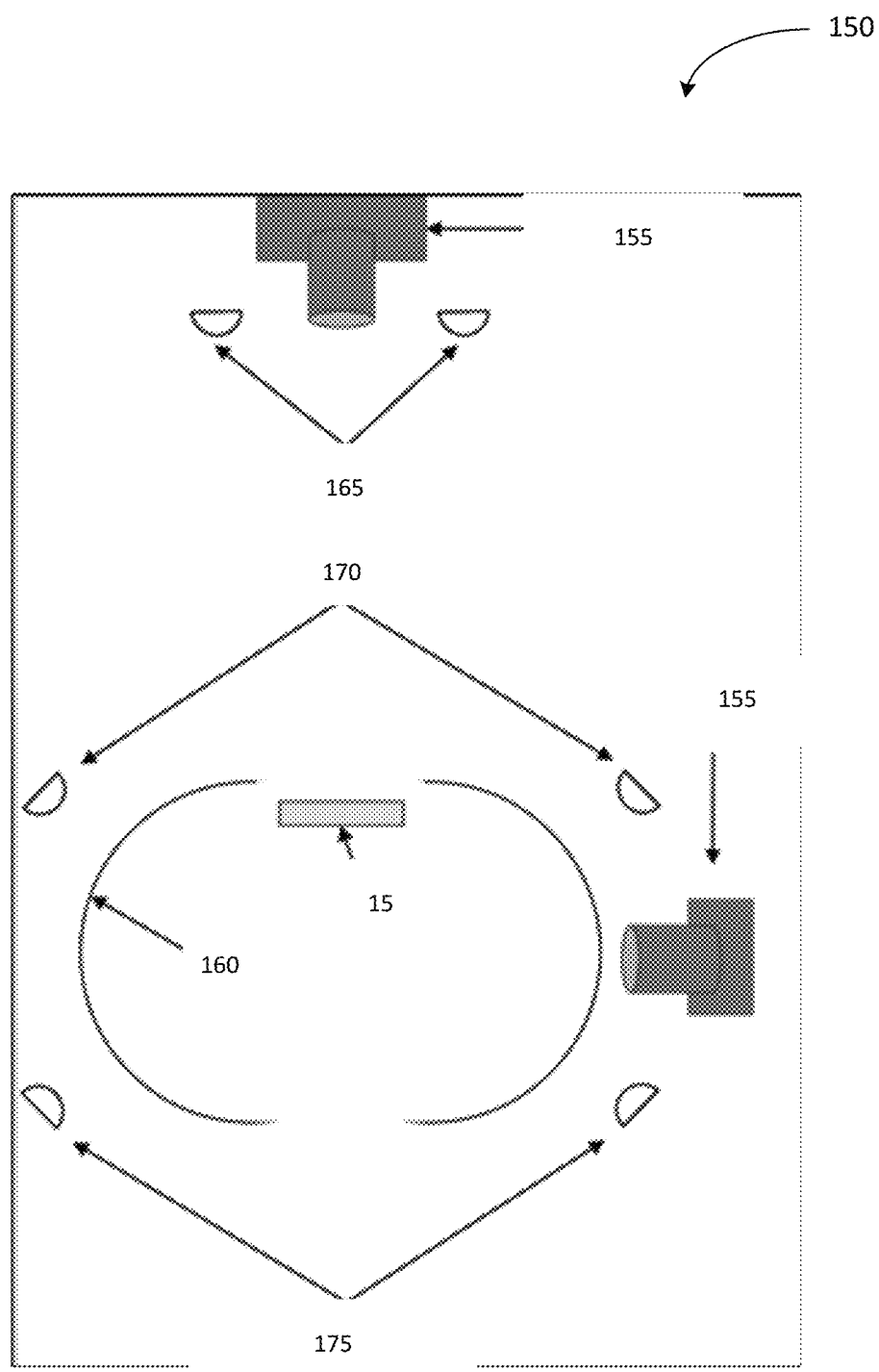
FIG. 3 shows a schematic view of a camera system of the cosmetic inspection system of FIG. 1, according to an embodiment.

FIG. 3 shows a schematic view of a camera system 150 of the cosmetic inspection system of FIG. 1, according to an embodiment.

The camera system 150 includes a plurality of cameras 155, a dome 160, a plurality of top lights 165, a plurality of upper dome lights 170, and a plurality of lower dome lights 175. The combination of components of the camera system 150 can be used to capture various views of the computing device 15 under test. In an embodiment, the images captured using the camera system 150 can be used by the cosmetic inspection system 10 to analyze the cosmetic appearance of the computing device 15 and output a cosmetic grade to the display 20 of the cosmetic inspection system 10.

The plurality of cameras 155 are representative of, for example, digital cameras. Although two cameras are shown, it is to be appreciated that the camera system 150 includes three cameras, with the third camera 155 being disposed in the page (or out of the page), and thus not illustrated. The plurality of cameras 155 can include fixed ISO, f-number parameters, and aperture priority mode. In an embodiment, the plurality of cameras 155 can be configured to capture images that are at or about 2 MB in resolution. Images of this size can, for example, offer a significant reduction in the size of the images being stored relative to prior systems which typically require multiple gigabytes of storage per image.

The dome 160 provides for even light distribution to the computing device 15, enabling for generating higher quality images with reduced glare. As a result, the cosmetic inspection system 10 can provide a higher quality result that is not subject to errors due to glare off the reflective surfaces of the computing device 15. In an embodiment, the dome 160 can be made of a translucent material that allows light transmission through the dome 160. For example, in one embodiment the dome 160 is a polyvinylchloride (PVC) material that is white in color and has a light transmission rate from at or about 0.6% to at or about 1.6%. In an embodiment, a light transmission rate of 1.6% can be selected. The dome 160 generally has a smooth outside and a matte inside finish. A shape of the dome 160 is selected to be generally shaped to match a geometry of the computing device 15 being tested by the cosmetic inspection system 10. In an embodiment, once the dome 160 shape is selected, the cosmetic inspection system 10 may be configured to inspect a corresponding computing device type. For example, if the dome 160 is shaped to correspond to a shape of a smartphone, then the cosmetic inspection system 10 may generally be configured for smartphone inspection, rather than inspection of, for example, laptop devices. The dome 160 includes a plurality of openings 180 to provide a viewpoint for the plurality of cameras 155. As a result, the number of openings 180 matches the number of cameras 155.

The plurality of lights 165, 170, 175 (i.e., plurality of top lights 165, a plurality of upper dome lights 170, and a plurality of lower dome lights 175) are disposed at locations outside of the dome 160. The plurality of lights 165, 170, 175 can be selectively enabled or disabled to provide a specific direction of light (and amount of light) through the dome 160 to capture the different views of the computing device 15. In an embodiment, the plurality of lights 165, 170, 175 are light emitting diode (LED) bar lights. In an embodiment, the plurality of lights 165, 170, 175 can be configured to provide a selected color of light. In an embodiment, the selected color of light can be white light.

Figure 4:
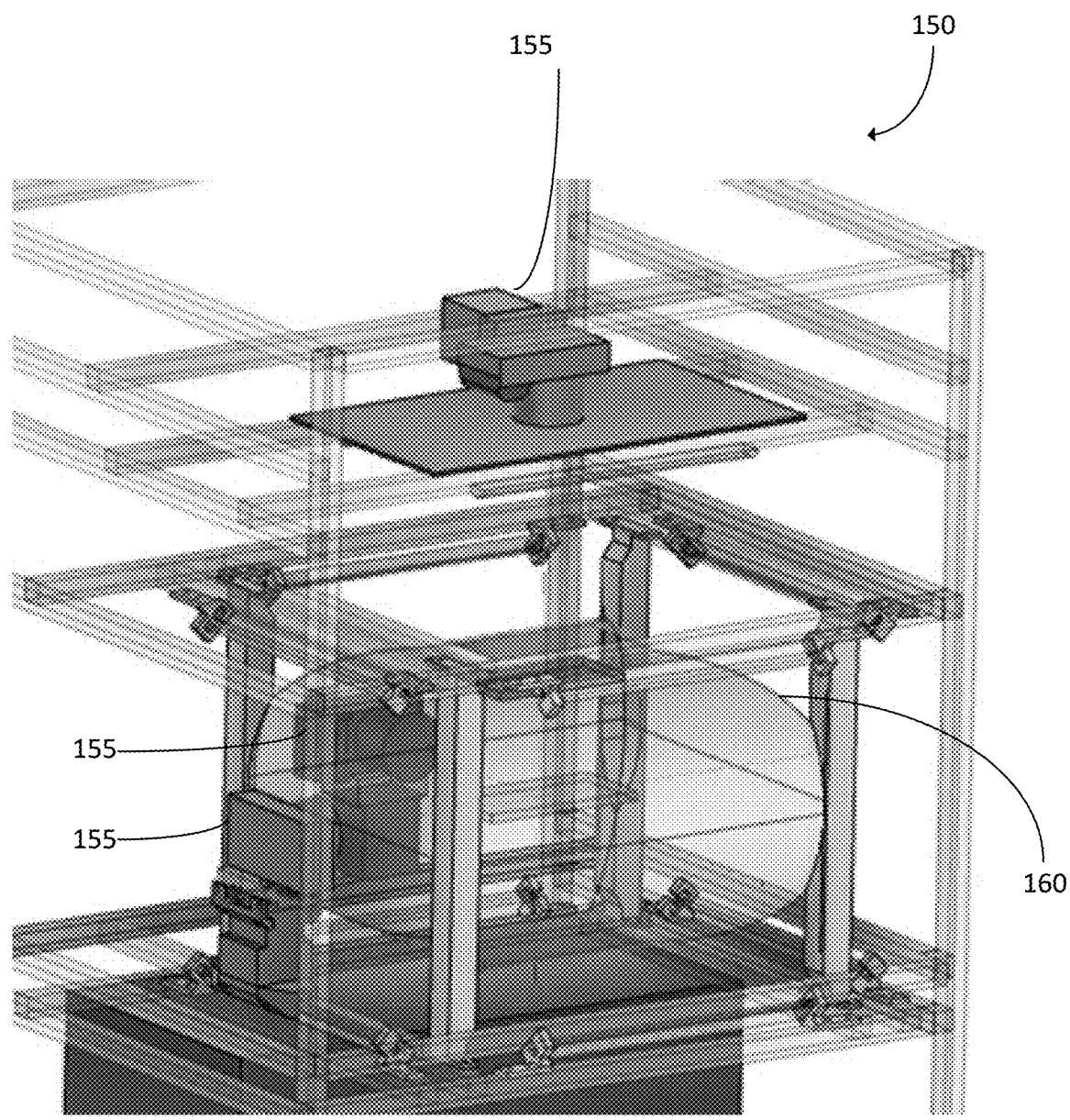
FIG. 4 shows a perspective view of the camera system of the cosmetic inspection system of FIG. 1, according to an embodiment.

FIG. 4 shows one embodiment of the camera system 150 including three cameras 155 and the dome 160. In the illustrated embodiment, an outline of the computing device 15 is shown at first and second positions. At the first position, the computing device 15 is disposed adjacent to an inner surface of the dome 160 at a vertical location that is relatively nearest to the top camera 155. In both the first and second positions, the computing device 15 is positioned at about a center in a horizontal direction of the dome 160. The second position is additionally positioned at about a center in the vertical direction of the dome 160. These positions provide for optimal lighting conditions when capturing images of the computing device 15, as described further in FIGS. 5-7 below.

Figure 5:
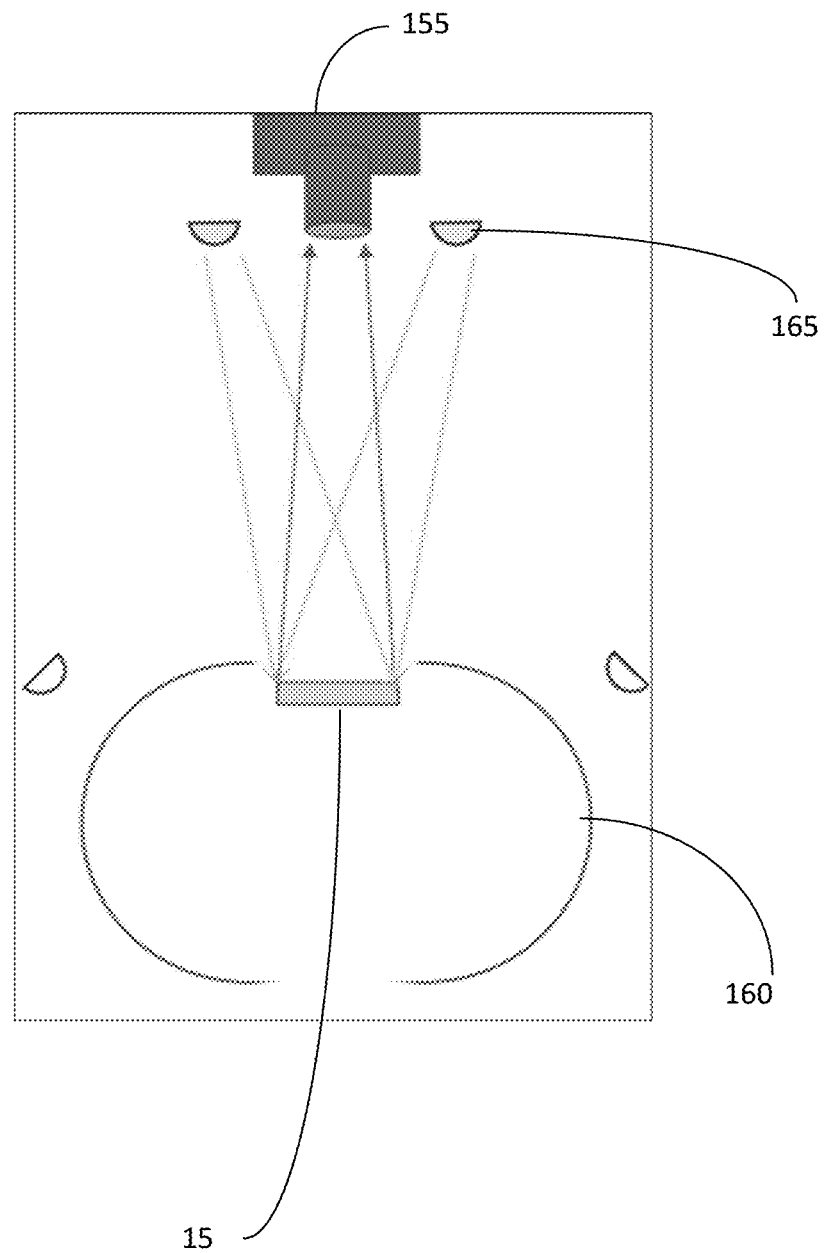
FIGS. 5-7 show schematic views of the camera system of FIG. 3 configured to capture different views of a computing device, according to an embodiment.
Figure 6:
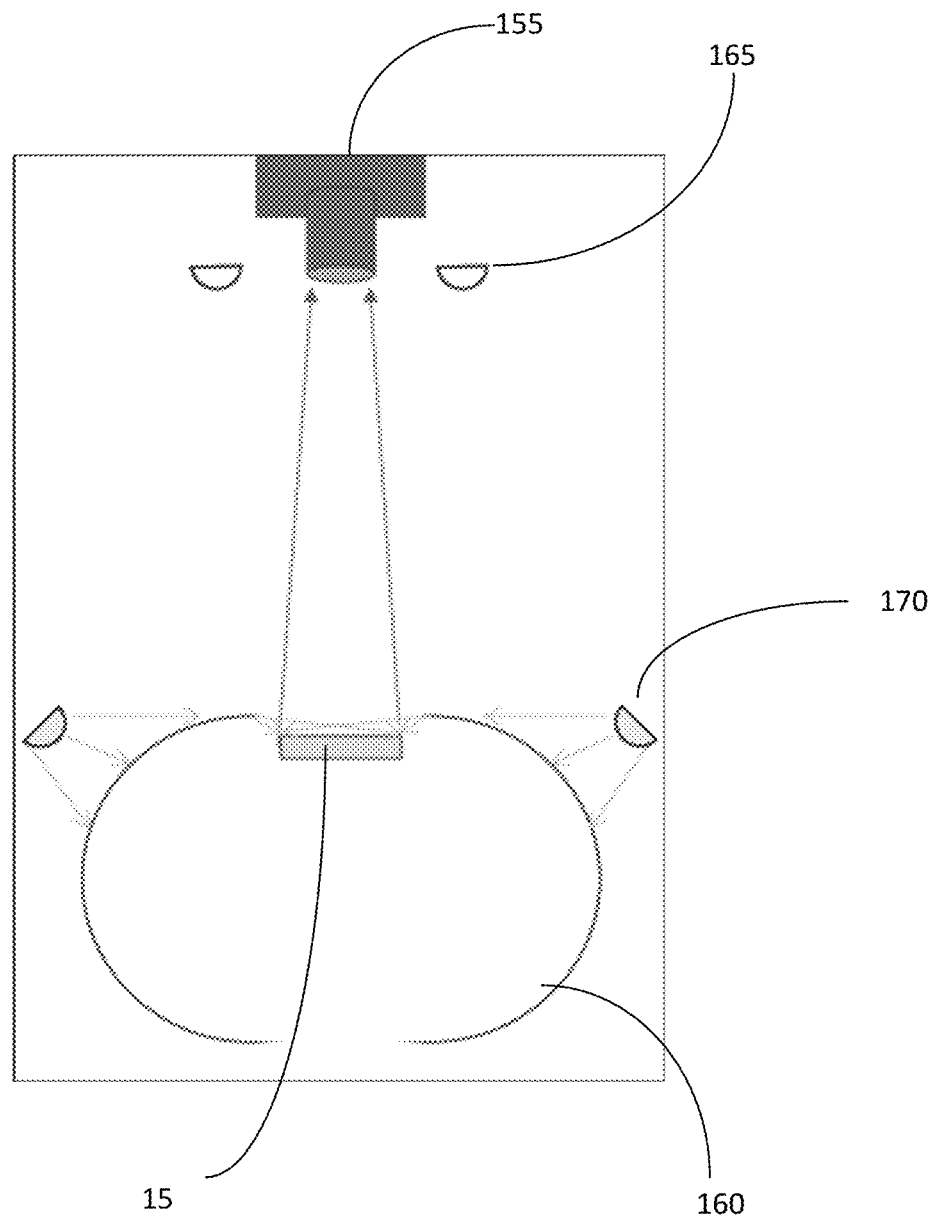
Figure 7:
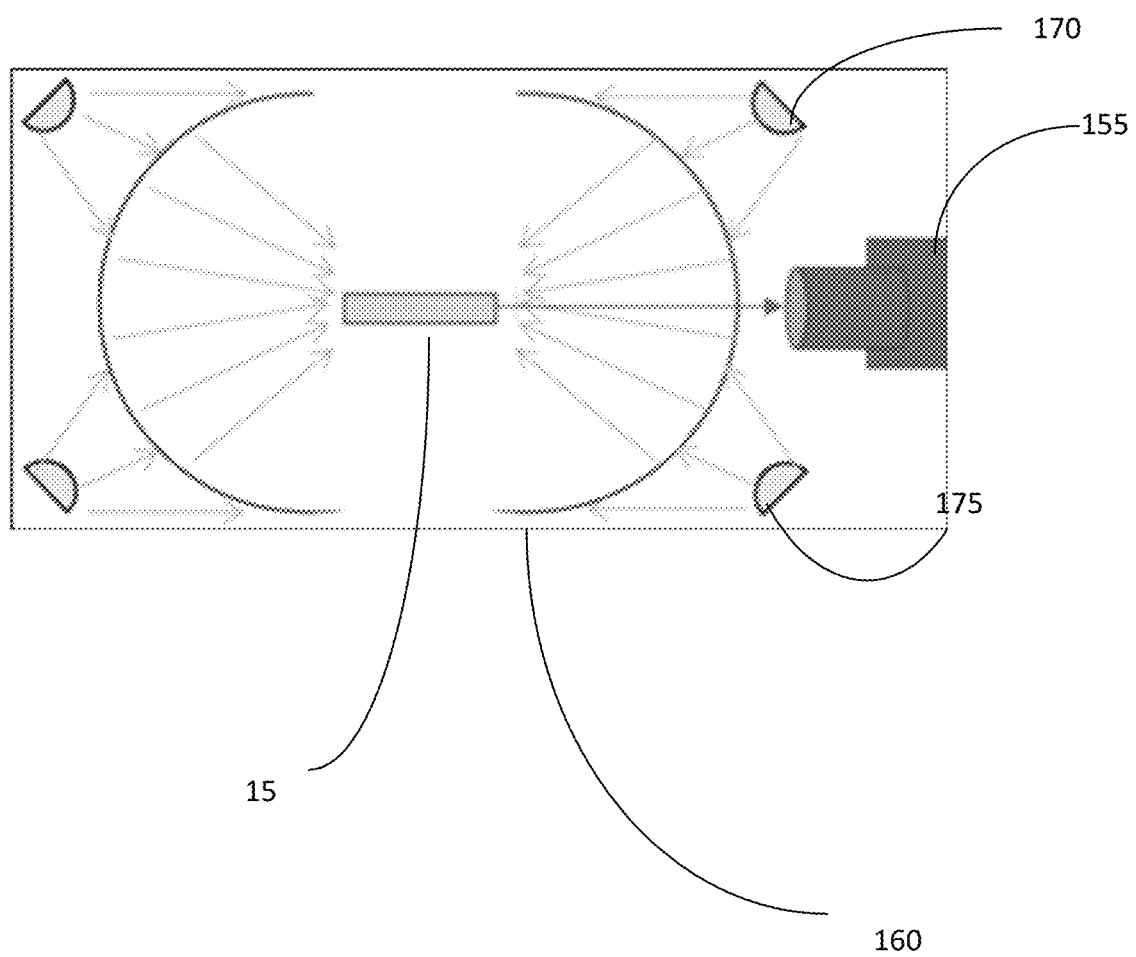

FIGS. 5-7 show schematic views of the camera system of FIG. 3 configured to capture different views of the computing device 15, according to an embodiment.

FIG. 5 shows a view when capturing a first top view of the computing device 15, according to an embodiment. In the illustrated embodiment, the cosmetic inspection system 10 moves the computing device 15 to a position in which the computing device 15 is aligned adjacent to an inner surface of a top of the dome 160. The computing device 15 is positioned horizontally within the dome to be at or about the center of the dome 160 in the horizontal direction. To capture the first top view, the plurality of top lights 165 are enabled to emit light toward the computing device 15. Although reference is made to the "first top view," it is to be appreciated that the surface of the computing device 15 that is captured is dependent upon the orientation of the computing device 15. Accordingly, the configuration in FIG. 5 can be used to capture either the front surface (e.g., the display surface) or the back surface of the computing device 15. When capturing the first top view, the image can be used to detect cosmetic defects of various materials on the front or rear surface of the phone, such as glass, metal, or plastic. In an embodiment, when the rear surface of the phone is being captured, the image as captured can be used to verify a type of the computing device 15. For example, computing devices generally include a barcode or other identifier that can be captured and analyzed to determine the manufacturer and make of the computing device 15. This can be used to determine which profile images to use when completing the cosmetic inspection. In an embodiment, the rear surface can be the first surface captured to select the appropriate profile images.

FIG. 6 shows a view when capturing a second top view of the computing device 15, according to an embodiment. In the illustrated embodiment, the cosmetic inspection system 10 moves the computing device 15 to a position in which the computing device 15 is aligned adjacent to an inner surface of a top of the dome 160. The computing device 15 is positioned horizontally within the dome to be at or about the center of the dome 160 in the horizontal direction. In the second top view, the plurality of top lights 165 are disabled and the plurality of upper dome lights 170 are enabled. Although reference is made to the "second top view," it is to be appreciated that the surface of the computing device 15 that is captured is dependent upon the orientation of the computing device 15. Accordingly, the configuration in FIG. 6 can be used to capture either the front surface (e.g., the display surface) or the back surface of the computing device 15. When capturing the second top view, the image can be used to detect cracks in glass materials on the front or rear surfaces of the computing device 15.

FIG. 7 shows a view when capturing a side view of the computing device 15, according to an embodiment. In the illustrated embodiment, the cosmetic inspection system 10 moves the computing device 15 to a position in which the computing device 15 is positioned horizontally within the dome 160 to be at or about the center of the dome 160 in the horizontal direction and similarly vertically within the dome 160 to be at or about a center of the dome 160 in the vertical direction. In the side view, the plurality of upper dome lights 170 and the plurality of lower dome lights 175 are enabled. Although not shown in the illustrated figure, the plurality of top lights 165 are disabled in capturing the side view. When capturing the side view, the image can be used to detect defects in the various materials on the side surfaces of the computing device 15, including plastic, matte metal, highly reflective metals, and the like.

The plurality of views captured (e.g., from FIGS. 5-7) can be used to grade the cosmetic appearance of the computing device 15. Each of the views contributes to the cosmetic grade. In an embodiment, the cosmetic grade can be weighted differently depending upon the type of defect. For example, in an embodiment, defects on the sides of the computing device 15 may be weighted with less significance than defects on the front surface (e.g., the display) of the computing device 15. Similarly, defects on the rear surface of the computing device 15 may be weighted with less significance than defects on the front surface of the computing device 15. In an embodiment, the weighting of the defects and the rules associated with grading the cosmetic appearance may be determined by the reseller of the refurbished device. Similarly, if the cosmetic inspection system 10 is used during the initial manufacturing process, the weighting can be controlled to provide significance according to rules of the manufacturer of the computing device 15.

Figure 8:
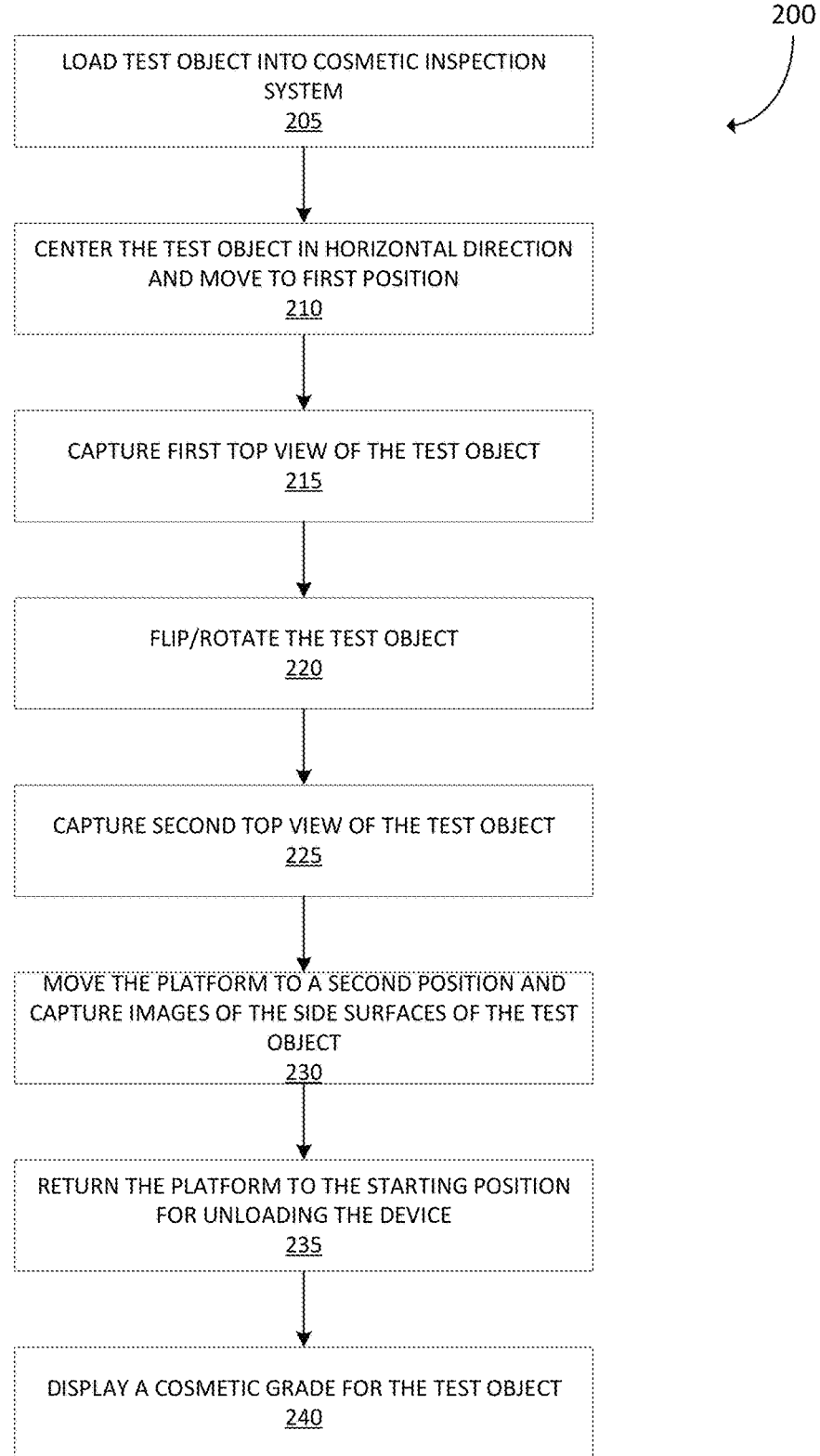
FIG. 8 shows a flowchart for a method for inspecting a cosmetic appearance of a test object, according to an embodiment.

FIG. 8 shows a flowchart for a method 200 for inspecting a cosmetic appearance of a test object, according to an embodiment. The method 200 can be performed by the cosmetic inspection system 10, and accordingly, by the processing device 115.

At block 205, a test object (e.g., computing device 15 or the like) is loaded into the cosmetic inspection system 10. In an embodiment, the test object can be loaded by a human operator. In an embodiment, the test object can be loaded by a robotic or mechanical arm.

At block 210, the movable platform can center the device in a horizontal direction and vertically move the movable platform to a first position. At the first position, the test object can be flipped so that the a rear surface of the test object is facing upward (e.g., facing toward a first camera of the plurality of cameras).

At block 215, a first top view is captured of the test object. The first top view can generally include an identifier (e.g., a barcode or the like) on the surface of the test object. The first top view captured can be used to determine a manufacturer and model of the test object. The information as determined can be used to select an appropriate set of profile images against which the cosmetic inspection can be compared.

At block 220, the test object can again be flipped so that the front surface of the test object is facing upward toward the first camera of the plurality of cameras.

At block 225, a second top view of the test object can be captured.

At block 230, the movable platform can be moved and images of the side surfaces of the test object captured.

At block 235, the movable platform can return to the starting position for unloading of the device.

At block 240, a cosmetic grade is displayed to the user via the display device of the cosmetic inspection system.

Figure 9:
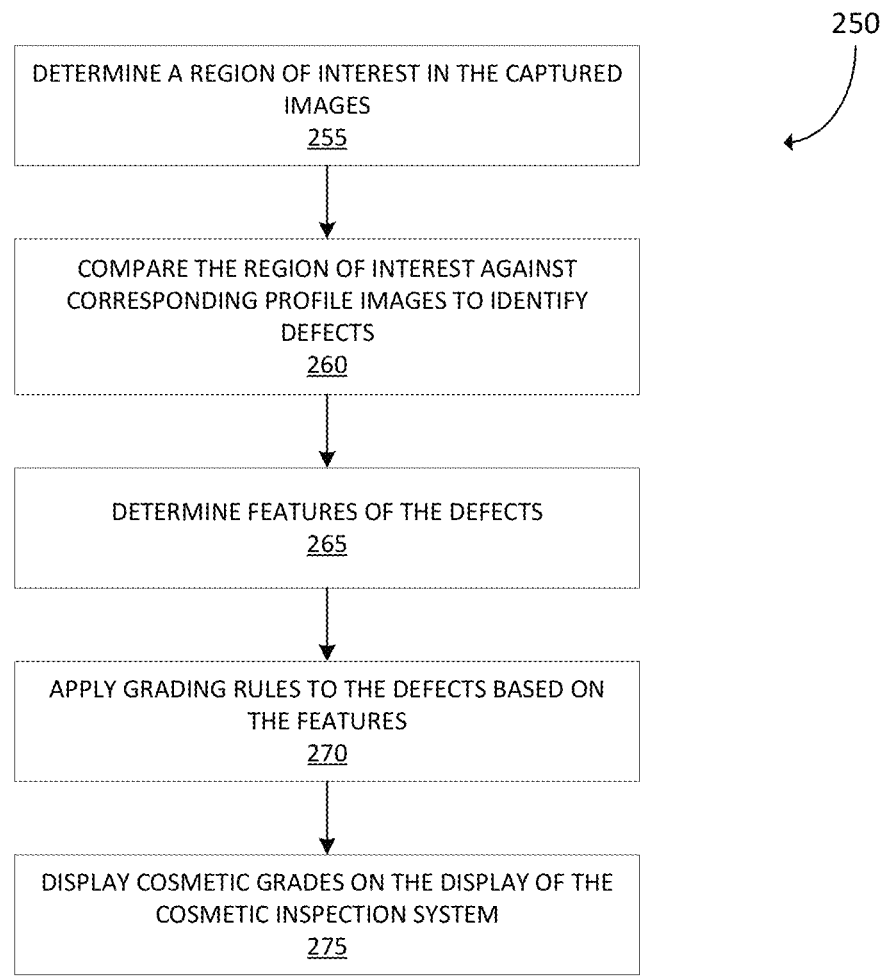
FIG. 9 shows a flowchart for a method for grading the cosmetic appearance of a test object, according to an embodiment.

FIG. 9 shows a flowchart for a method 250 for grading the cosmetic appearance of a test object, according to an embodiment. The method 250 can generally be performed at block 240 of FIG. 8. The method 250 can grade the cosmetic appearance of the test object using artificial intelligence. The method 250 can use both rule-based and artificial intelligence (AI) solutions. Rule-based solutions include model learning and rule configuration, image capture and processing, and grading. AI solutions can include artificial neural networks such as, but not limited to, convolutional neural networks (CNN), data augmentation learning, incremental learning, and the like. Automatic cosmetic grading learns grading criteria using AI or machine learning, which allows for an abbreviated, rule-based training.

At block 255, the method 250 includes determining a region of interest (ROI) of the images being captured. This can be performed for each captured image. Block 255 includes aligning the image of the test object and the image of the model object. In an embodiment, aligning the image of the test object with the model object allows for side-by-side comparison of the images. In an embodiment, if the images are misaligned, false positives can be generated when identifying defects. In an embodiment, the image alignment is based on a structure or shape of the test object instead of color or intensity values. This method can, for example, enable comparison of objects that are similar in shape and size, but different in color. As a result, the grading engine can be trained for a particular size/shape object (e.g., a given profile image of a computing device), but need not be trained for every possible color variation of the object. In an embodiment, the grading engine is also less susceptible to false positives resulting from lighting variations.

At block 260, the captured images are compared against the profile images to identify defects (e.g., scratches, cracks, nicks or dents, discoloration, pin dots, or the like). In an embodiment, this can be performed using a structure-edge algorithm to identify the edges of defects in the test object in the captured images. In an embodiment, aligning the image of the test object with the model object allows for side-by-side comparison of the images. In an embodiment, if the images are misaligned, false positives can be generated when identifying defects. At block 265, features of the defects can be determined. This can include, for example, identifying a width, length, area, contrast, depth, or the like of the defects as identified at block 260.

At block 270, grading rules can be applied against the features of the defects determined at block 265. The grading rules can be specific to an entity responsible for the refurbishing of the test object. For example, the reseller of the test object can provide rules that are specific to a device type. In an embodiment, the grading rules can include establishing a relative significance based on the type of the defect, the severity of the defect, the location of the defect, or the like. The grading can be accomplished via a grading engine that is trained with grading criteria and training images (e.g., in a training model database).

At block 275, a cosmetic grade is produced and can be displayed on the display device of the cosmetic inspection system 10. In an embodiment, the cosmetic grade can be one or more of flawless, lightly-scratched, heavily scratched, or the like. In an embodiment, the cosmetic grade may be an overall score based on a combination of grading scores for the plurality of sides of an object. In an embodiment, the overall score can be based on a lowest score of the grading scores for the plurality of sides of an object. In an embodiment, cosmetic defects can be weighted based on which side of the object the defect occurs. For example, a defect on the front surface of a test object (e.g., when the test object is a computing device, the front surface is the display screen of the computing device) can be relatively more impactful to the cosmetic grade than a defect on a side surface of the test object.

Figure 10:
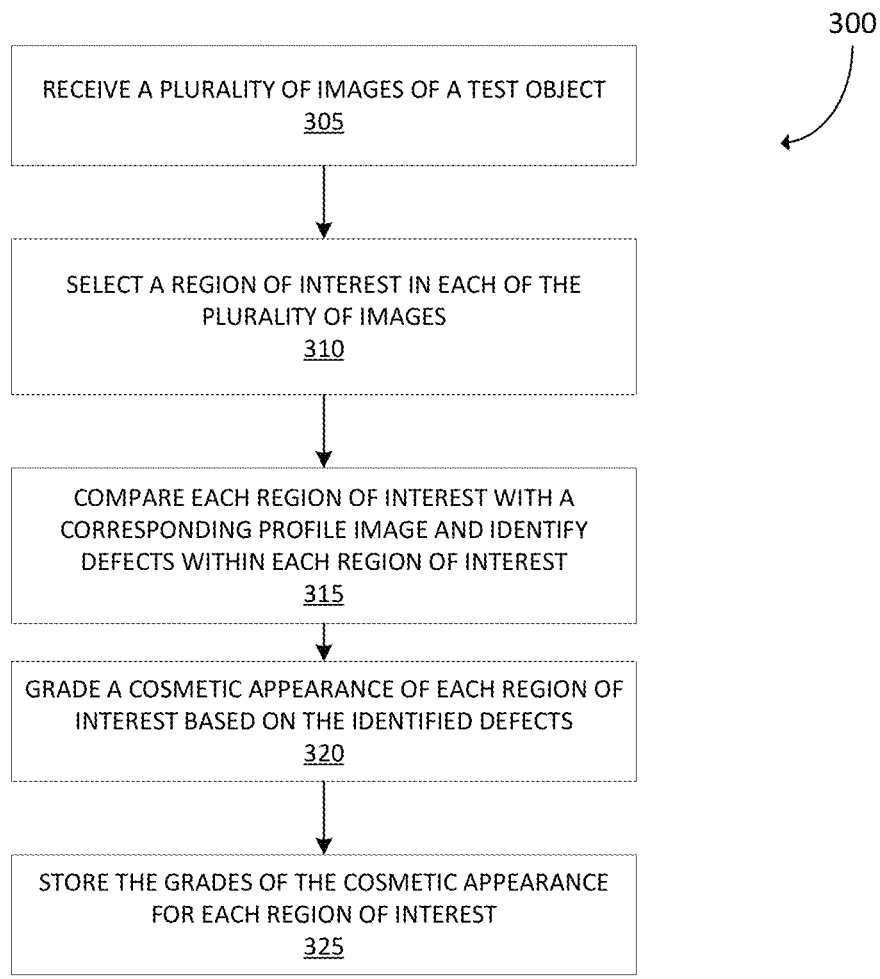
FIG. 10 shows a flowchart for a method 300 for grading the cosmetic appearance of a test object, according to an embodiment.

FIG. 10 shows a flowchart for a method 300 for grading the cosmetic appearance of a test object, according to an embodiment.

At block 305, the method 300 includes receiving a plurality of images of a test object. In an embodiment, the plurality of images of a test object can include an image per surface of the test object. For example, when the test object is a computing device such as a smartphone, the plurality of images can include six images including images of: (1) a front surface (e.g., display), (2) a back surface (e.g., the back of the computing device opposite the front surface), (3) side surfaces extending between the front and back surface. In an embodiment, the plurality of images of the test object can include fewer images than number of surfaces of the object. In such an embodiment, the images can include only major surfaces of the test object. For example, when the test object is a computing device such as a smartphone, the images can include front and back surfaces of the computing device.

In an embodiment, along with the plurality of images received at block 305, an indication of a corresponding profile object which can be used in the comparison can be received at block 305. For example, if the test object is a computing device such as a smartphone, the method 300 can include receiving a model or other identifier that can be used to select corresponding profile images for the purposes of identifying defects in the received plurality of images of the test object.

At block 310, the method 300 includes selecting a region of interest in the plurality of images. At block 310, the plurality of images can be cropped to remove the background so that the test object remains in the image. Block 310 can also include an alignment of the resulting region of interest with corresponding profile images. In an embodiment, aligning the image of the test object with the model object allows for side-by-side comparison of the images. In an embodiment, if the images are misaligned, false positives can be generated when identifying defects. In an embodiment, the image alignment is based on a structure or shape of the test object instead of color or intensity values. This method can, for example, enable comparison of objects that are similar in shape and size, but different in color. As a result, the grading engine can be trained for a particular size/shape object (e.g., a given profile image of a computing device), but need not be trained for every possible color variation of the object. In an embodiment, the grading engine is also less susceptible to false positives resulting from lighting variations.

At block 315, the method 300 includes comparing each region of interest with a corresponding profile image and identifying defects within each region of interest. Because the region of interest was aligned with the corresponding profile image, a likelihood of receiving a false positive is reduced. In an embodiment, a structure-edge algorithm can be used during the comparison to identify the defects present in the test object. The structure-edge algorithm can utilize an artificial neural network, in an embodiment. The structure-edge algorithm generally uses image brightness variations to identify the edges of defects. The defects being identified at block 315 can include, but are not limited to, scratches, cracks, nicks and dents, discolorations, groups of pin dots, and suitable combinations thereof.

At block 320, the method 300 includes grading a cosmetic appearance of each region of interest based on the identified defects. There can be a plurality of different grading rules relied upon. The grading rules can be specific to an entity responsible for the refurbishing of the test object. For example, the reseller of the test object can provide rules that are specific to a device type. In an embodiment, the grading rules can include establishing a relative significance based on the type of the defect, the severity of the defect, the location of the defect, or the like. The grading can be accomplished via a grading engine that is trained with grading criteria and training images (e.g., in a training model database). A cosmetic grade can be one or more of flawless, lightly-scratched, heavily scratched, or the like. In an embodiment, the cosmetic grade may be an overall score based on a combination of grading scores for the plurality of sides of an object. In an embodiment, the overall score can be based on a lowest score of the grading scores for the plurality of sides of an object. In an embodiment, cosmetic defects can be weighted based on which side of the object the defect occurs. For example, a defect on the front surface of a test object (e.g., when the test object is a computing device, the front surface is the display screen of the computing device) can be relatively more impactful to the cosmetic grade than a defect on a side surface of the test object.

At block 325, the method 300 includes storing the grades of the cosmetic appearance for each region of interest.

Examples of computer-readable storage media include, but are not limited to, any tangible medium capable of storing a computer program for use by a programmable processing device to perform functions described herein by operating on input data and generating an output. A computer program is a set of instructions that can be used, directly or indirectly, in a computer system to perform a certain function or determine a certain result. Examples of computer-readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing.

In some embodiments, hardwired circuitry may be used in combination with software instructions. Thus, the description is not limited to any specific combination of hardware circuitry and software instructions, nor to any source for the instructions executed by the data processing system.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, operations, elements, and/or components, but do not preclude the presence or addition of one or more other features, integers, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A method, comprising:
   receiving, by a processing device, a plurality of images of a test object, the plurality of images including a plurality of surfaces of the test object and captured with use of a reflection reduction lighting system that controls lighting to reduce reflections to enable defects to be identified rather than reflections on the plurality of surfaces of the test object,
      wherein the reflection reduction lighting system includes at least one semi-transparent dome with at least one opening in the at least one semi-transparent dome for receiving the test object,
      wherein the at least one semi-transparent dome is made of plastic and has a light transmission rate of 0.6% to 1.6%, and
      wherein a shape of the at least one semi-transparent dome is selected to match a geometry of the test object;
   selecting, by the processing device, a region of interest in each of the plurality of images, the region of interest comprising the test object having a background removed;
   for the plurality of regions of interest as selected,
      aligning each of the plurality of images with corresponding profile images, and
      comparing, by the processing device, each region of interest with a respective corresponding profile image and identifying defects in each region of interest,
      wherein the identifying defects in each region of interest comprises identifying brightness variations indicating an edge of a defect;
   grading, by the processing device, a cosmetic appearance of each region of interest based on the identified defects; and
   storing the grades of the cosmetic appearance for each region of interest.

2. The method of claim 1, wherein the defects include scratches, cracks, discoloration, and combinations thereof.

3. The method of claim 1, comprising determining one or more features of the defects of each region of interest as identified, wherein the one or more features comprise dimensions of a defect, area of a defect, contrast of a defect, depth of a defect, and combinations thereof.

4. The method of claim 3, wherein grading the cosmetic appearance of each region of interest is based on a severity of the identified defects as determined from the one or more features of the identified defects.

5. The method of claim 1, comprising outputting, by the processing device, the grades of the cosmetic appearance for each region of interest on a display.

6. The method of claim 1, wherein grading the cosmetic appearance of each region of interest based on the identified defects comprises weighting a significance of a defect based on its location on the plurality of surfaces of the test object.

7. The method of claim 1, wherein grading the cosmetic appearance of each region of interest based on the identified defects comprises weighting a significance of a defect based on a defect type, wherein the types of defects include scratches, cracks, and discoloration.

8. The method of claim 1, comprising: aligning the plurality of images with corresponding profile images.

9. A method, comprising:
capturing an image of a first surface of a computing device with a first camera;
determining, by a processing device, a model and manufacturer of the computing device based on the image of the first surface of the computing device;
rotating the computing device to capture a second surface of the computing device that is opposite the first surface;
capturing an image of the second surface of the computing device with the first camera;
moving the computing device to a second location and capturing an image of a third surface using a second camera and capturing an image of a fourth surface using a third camera;
rotating the computing device to capture fifth and sixth surfaces that are opposite the third and fourth surfaces;
capturing an image of the fifth surface using the second camera and capturing an image of the sixth surface using the third camera;
selecting, by the processing device, a region of interest in each of the images, the region of interest comprising the computing device having a background removed;
for each region of interest as selected,
 aligning the plurality of images with corresponding profile images;
 comparing, by the processing device, each region of interest with a respective corresponding profile image and identifying defects in each region of interest,
wherein the identifying defects in each region of interest comprises identifying brightness variations indicating an edge of a defect;
grading, by the processing device, a cosmetic appearance of each region of interest based on the identified defects; and
storing the grades of the cosmetic appearance for each region of interest;
wherein the images are captured with use of a reflection reduction lighting system that controls lighting to reduce reflections to enable defects to be identified rather than reflections on the plurality of surfaces of the test object, wherein the reflection reduction lighting system includes at least one semi-transparent dome with at least one opening in the at least one semi-transparent dome for receiving the test object, wherein the at least one semi-transparent dome is made of plastic and has a light transmission rate of 0.6% to 1.6%, and wherein a shape of the at least one semi-transparent dome is selected to match a geometry of the test object.

10. The method of claim 9, wherein the first surface is a rear surface of the computing device and the second surface is a front surface of the computing device, the second surface being a display of the computing device.

11. The method of claim 9, wherein the third, fourth, fifth, and sixth surfaces are side surfaces of the computing device.

12. The method of claim 9, wherein the defects include scratches, cracks, discoloration, and combinations thereof.

13. The method of claim 9, comprising determining one or more features of the defects of each region of interest as identified, wherein the one or more features comprise dimensions of a defect, area of a defect, contrast of a defect, depth of a defect, and combinations thereof.

14. The method of claim 13, wherein grading the cosmetic appearance of each region of interest is based on a severity of the identified defects as determined from the one or more features of the identified defects.

15. The method of claim 9, comprising outputting, by the processing device, the grades of the cosmetic appearance for each region of interest on a display.

16. The method of claim 9, wherein grading the cosmetic appearance of each region of interest based on the identified defects comprises weighting a significance of a defect based on its location on the plurality of surfaces of the computing device.

17. The method of claim 9, wherein grading the cosmetic appearance of each region of interest based on the identified defects comprises weighting a significance of a defect based on a defect type, wherein the types of defects include scratches, cracks, and discoloration.

* * * * *